(12) United States Patent
Kretz et al.

(10) Patent No.: US 6,611,311 B1
(45) Date of Patent: Aug. 26, 2003

(54) ACTIVE-MATRIX DISPLAY SCREEN (75) Inventors: Thierry Kretz, Saint Jean de Moirans (FR); Hugues Lebrun, Coublevie (FR)

(73) Assignee: Thomson-LCD, Paris (FR)

( * ) Notice: Subject to any disclaimer, the term of this patent is extended or adjusted under 35 U.S.C. 154(b) by 0 days.

(21) Appl. No.: 09/269,705
(22) PCT Filed: Sep. 29, 1997
(86) PCT No.: PCT/FR97/01711
§ 371 (c)(1), (2), (4) Date: Mar. 31, 1999
(87) PCT Pub. No.: WO98/15873
PCT Pub. Date: Apr. 16, 1998

(30) Foreign Application Priority Data

Oct. 7, 1996 (FR) .............................................. 96 12171

(51) Int. Cl.⁷ .......................................... G02F 10/1343
(52) U.S. Cl. ...................................... 349/143; 349/147
(58) Field of Search .............................. 349/42–43, 143, 349/147; 257/59, 72, 60

(56) References Cited

U.S. PATENT DOCUMENTS 5,654,731 A * 8/1997 Stewart et al. ................ 349/42
5,953,092 A * 9/1999 Sung et al. ................... 349/143
6,115,090 A * 9/2000 Yamazaki ..................... 349/42

\* cited by examiner

*Primary Examiner*—Robert H. Kim
*Assistant Examiner*—Dung Nguyen
(74) *Attorney, Agent, or Firm*—Joseph S. Tripoli; Carlos M. Herrera; Richard LaPeruta, Jr.

(57) ABSTRACT

The invention concerns a display screen with active matrix comprising first and second transparent substrates enclosing a crystal liquid material, at least one counter electrode, pixel electrodes in lines and in columns, data lines, perpendicular selection lines, control devices for connecting the lines to the pixel electrodes, the pixel electrodes being controlled such that the electrodes connected to a common selection line have the same polarity while, for two adjacent selection lines the polarity is reversed, the pixel electrodes being located in a first plane while the other elements are located in a second plane distanced from the first plane, and a transparent mass plane being located between the two planes. Moreover, the mass plane has a structure such that at least the part found between two pixel electrodes of same polarity is recessed. The invention is applicable to LCD.

15 Claims, 6 Drawing Sheets

ACTIVE-MATRIX DISPLAY SCREEN

FIELD OF INVENTION

The present invention relates to active-matrix display screens and more particularly to a pixel structure for these screens which allows a high open aperture ratio to be obtained.

BACKGROUND

In a known manner, an active-matrix display screen consists of a number of liquid-crystal cells or pixels arranged in a matrix array. The cells are formed from two substrates, preferably made of glass, which are bonded together via a peripheral seal which provides a thin cavity in which the liquid crystal lies. The first substrate is coated with a back electrode while the second substrate contains the pixel electrodes and, in the case of active-matrix screens, the solid-state drive devices placed between the electrodes to which they are connected as well as an array of selection lines and of data lines placed in two different directions.

The pixel electrodes of liquid-crystal screens are made of a transparent conductive material, such as indium-tin oxide (ITO). However, the selection lines, the data lines and the solid-state drive devices which are used for connecting the data lines to the pixel electrodes are made of an opaque conductive material. Moreover, in order to improve the contrast of the screen, an opaque mask or "black matrix" is usually deposited on the non-driven parts of the pixel. However, when the size of the pixels is reduced in order to limit the manufacturing costs, the opaque elements of the screen keep the same size approximately. This therefore affects the open aperture ratio or OAR which is defined as the transparent area of the panel divided by the total area. Thus, in high-density display screens such as the screens used in projection, the opaque elements of the screen may occupy more than 70% of the total area, leaving only a transparent area of approximately 30%. This results in a very significant loss of brightness and a reduction in picture quality. Moreover, when the size of the pixel electrodes is small, edge effects caused by the non-planar surfaces and perturbations due to the electric field are observed. These edge effects cause the contrast to suffer and result in a non-uniform display.

In order to remedy this drawback, the article IEDM 93, page 401 et seq. proposes a novel pixel structure comprising a transparent electrode between the data line and the pixel electrode, which screens the capacitive coupling between the data line and the pixel electrode and reduces the effects caused by the transverse electric field.

SUMMARY OF THE INVENTION

The subject of the present invention is a novel pixel structure which makes it possible to obtain a very high open aperture ratio with small pixel spacings. This novel structure is particularly advantageous in the manufacture of small active-matrix liquid-crystal display screens requiring high resolution combined with high transmission. The structure includes a transparent earth plane that contains a cut-away portion that is positioned between two adjacent pixel electrodes of the sane polarity and an aperture for connecting each pixel electrode to the corresponding switching device.

BRIEF DESCRIPTION OF THE DRAWINGS

Other characteristics and advantages of the present invention will appear on reading the description of various embodiments of an active-matrix display screen according to the present invention with reference to the drawings herein, in which.

As a result, there is no transparent or non-transparent metallic level present between the pixel electrodes with the same bias, thereby preventing the liquid-crystal molecules from disorganizing and therefore preventing significant light leakage. This zone 7 without any metallic level gives a region which is completely transparent in crossed polarizers when the pixel electrodes are slightly biased (<2 V), which increases the open aperture ratio or OAR when they are biased with a voltage greater than 2V, the contrast in the zone 7 without any metallic level following that of the neighbouring pixels.

According to a first embodiment, the opaque mask called a "black matrix" is produced by the selection line lying between the pixel electrodes of opposite bias.

According to another embodiment, an opaque metal mask forming a "black matrix" and a light-shielding screen is produced on the selection lines which lie between the pixel electrodes of opposite bias and the solid-state drive devices. When the solid-state drive device consists of a drive transistor of the bottom-gate type, very good shielding from incident light is achieved with this opaque metal mask. Preferably, this opaque metal mask is connected to the transparent earth plane, which is otherwise know in the art (in U.S. Pat. No. 5,654,731) as a transparent conductive shield. The transparent earth plane screens the electric fields between the selection lines and the pixel electrodes. In addition, this opaque metal mask is addressed, via the earth plane, by a negative DC voltage so as to disturb as little as possible the transistor leakage current when the line is not selected.

According to another embodiment of the present invention, when the drive device consists of a transistor of the top-gate type, the earth plane is connected to a voltage equal to the back-electrode voltage. However, when the drive device consists of a transistor of the bottom-gate type, the earth plane is connected to a voltage close to the turn-off voltage of the drive transistors.

According to another characteristic of the present invention, the data lines are produced beneath the pixel electrodes. Consequently, a minimum spacing between the adjacent pixel electrodes in all directions in the active matrix may be obtained, this minimum spacing being defined by the resolution of the exposure system used for the photolithography. This type of construction therefore allows drive electrodes having a rectangular shape to be obtained.

According to another characteristic of the present invention, if the pixel electrodes are in a delta arrangement, the data lines are straight, thereby making it easier to produce such screens.

Other characteristics and advantages of the present invention will appear on reading the description of various embodiments of an active-matrix display screen according to the present invention with reference to the drawings.

In order to simplify the description in the drawings, the same elements bear the same references.

Figure 1:
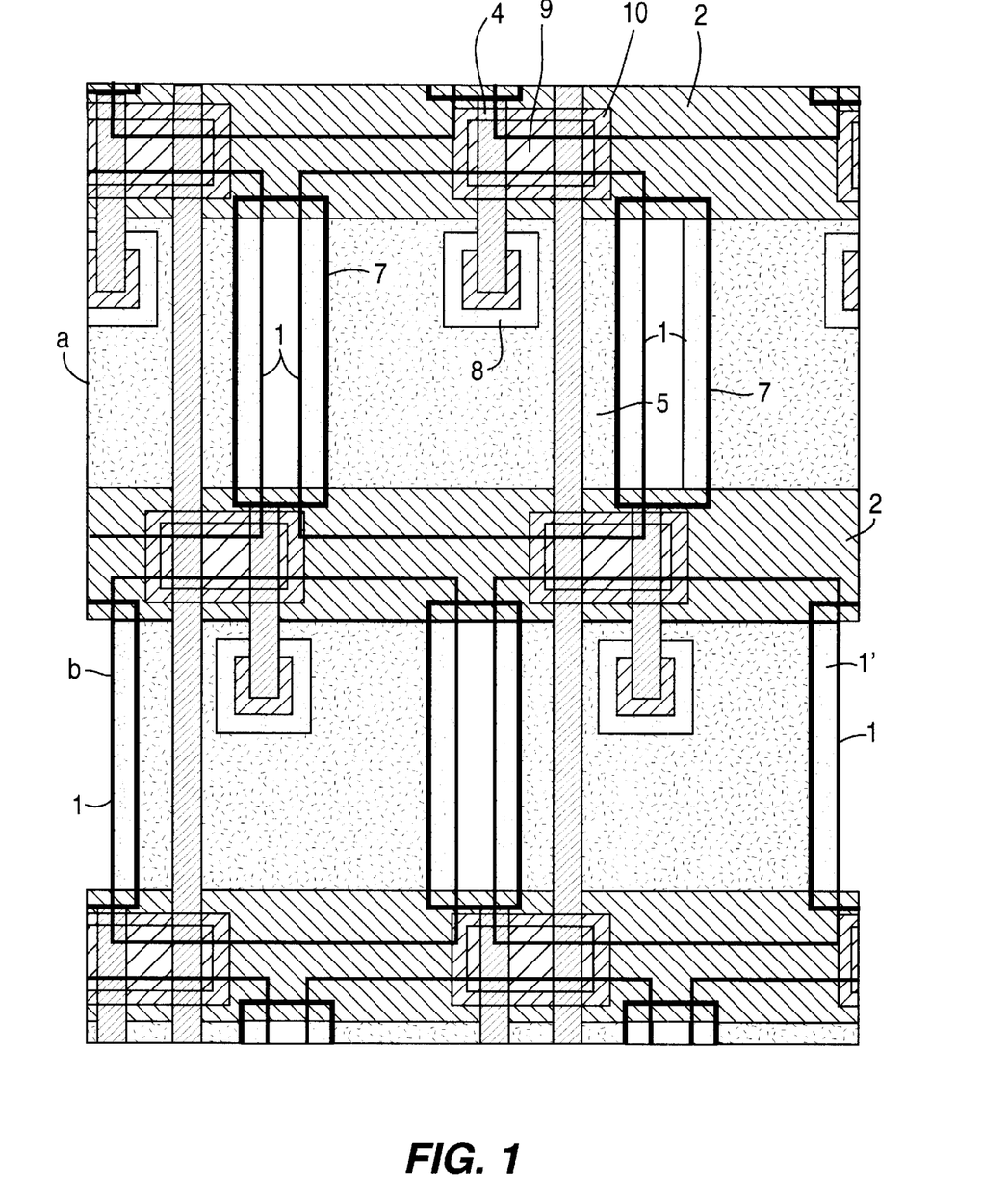
FIG. 1 is a plan view, on the active-matrix side, of a display screen according to a first embodiment of the present invention, showing a preferred screen structure in a delta configuration for an active matrix display screen which is a line-inversion mode device.

FIG. 1 shows a plan view of the top of a liquid-crystal display screen of the active-matrix type, this screen being seen through the back electrode which, in the embodiment shown, is made of ITO or of tin oxide $SnO_2$ deposited on glass. It is obvious to those skilled in the art that any known substrate may be used. Moreover, the present invention is described with reference to an active matrix in which the thin-film drive devices consist of TFT transistors of the bottom-gate type. By means of a few modifications, which will be explained below, the present invention also applies to switching devices consisting of TFT transistors of the top-gate type or to other known drive or switching devices, such as diodes.

Figure 2:
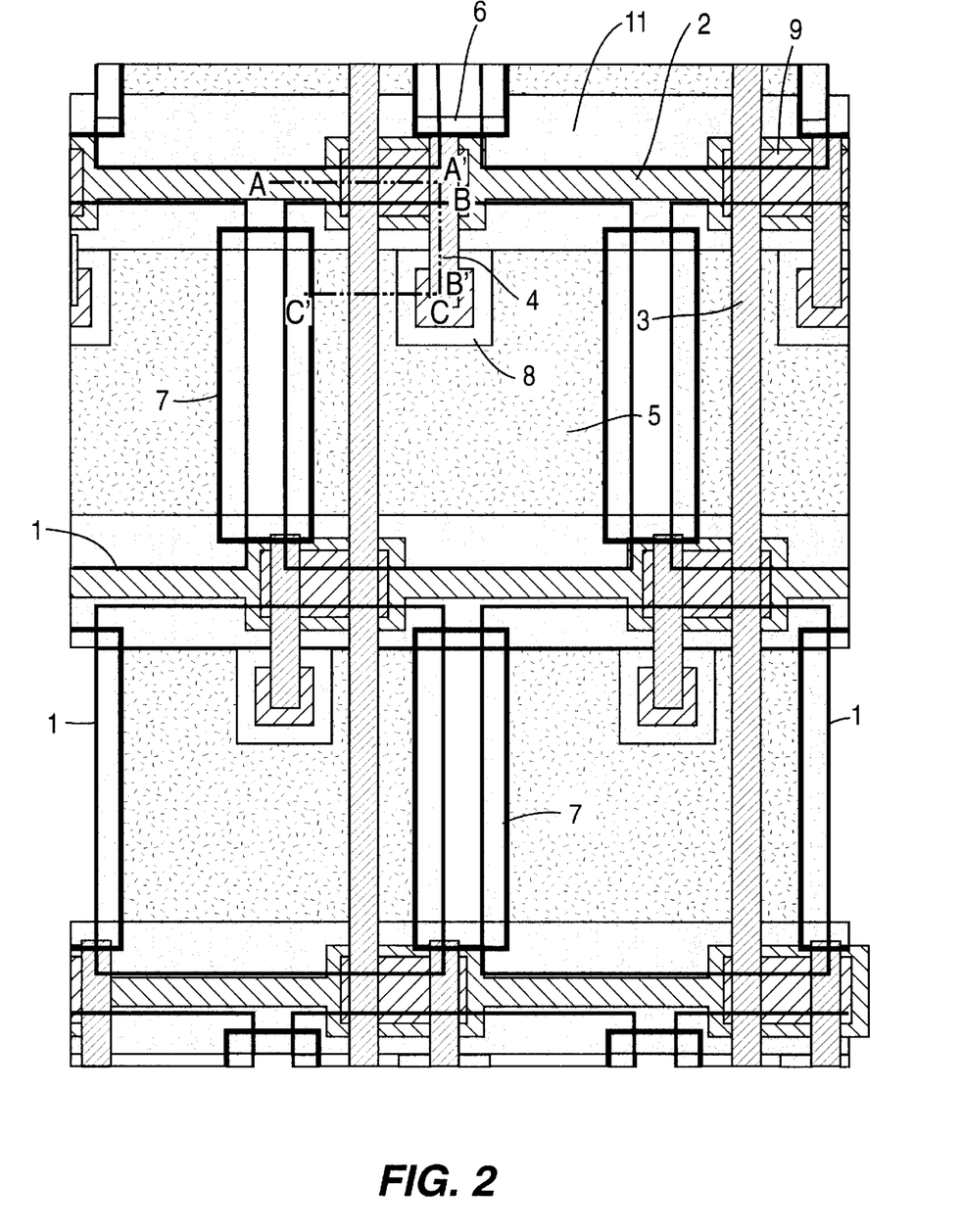
FIG. 2 is a plan view, on the active-matrix side, of a second embodiment of a display screen according to the present invention, showing another screen structure in a delta configuration for an active matrix display screen which is a line-inversion mode device.
Figure 3A:
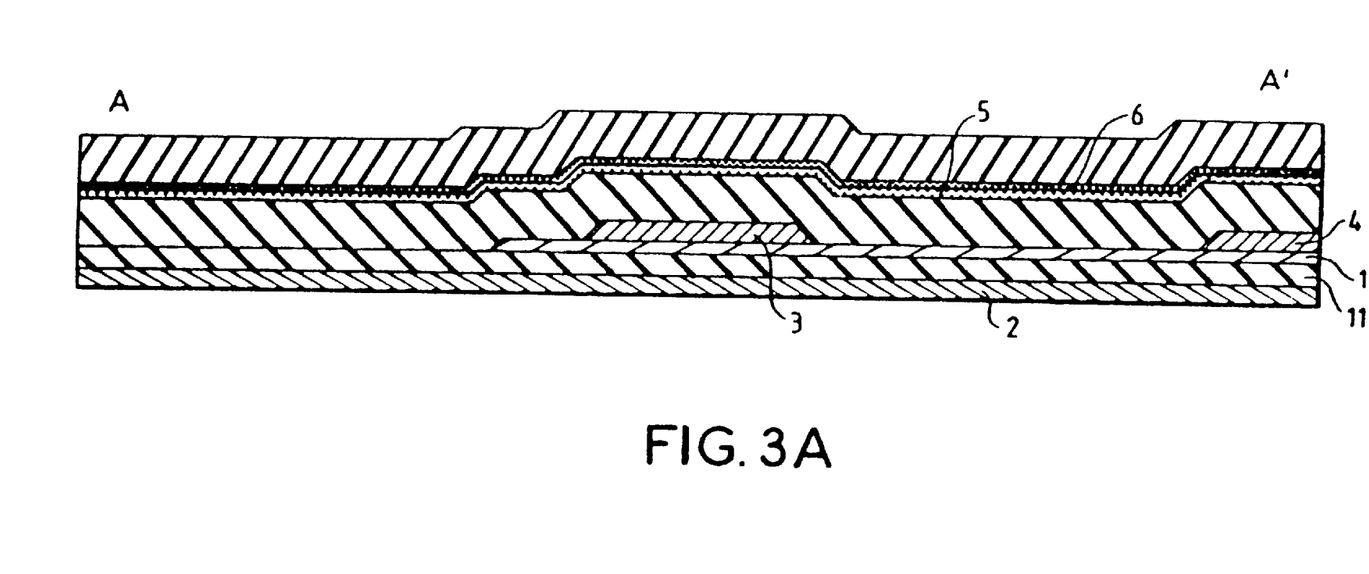
FIGS. 3a, 3b and 3c are, respectively, sectional views on AA', BB', CC' of the screen shown in FIG. 2.
Figure 3B:
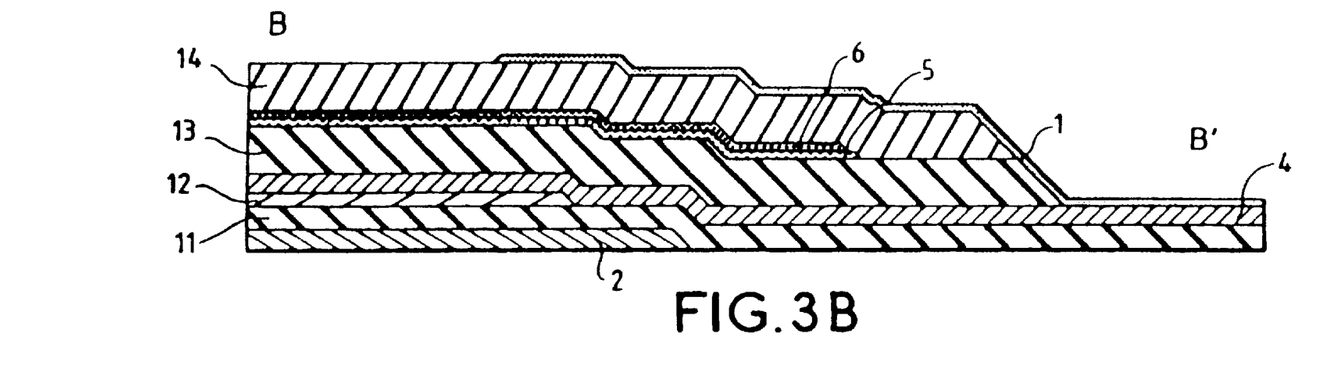
Figure 3C:
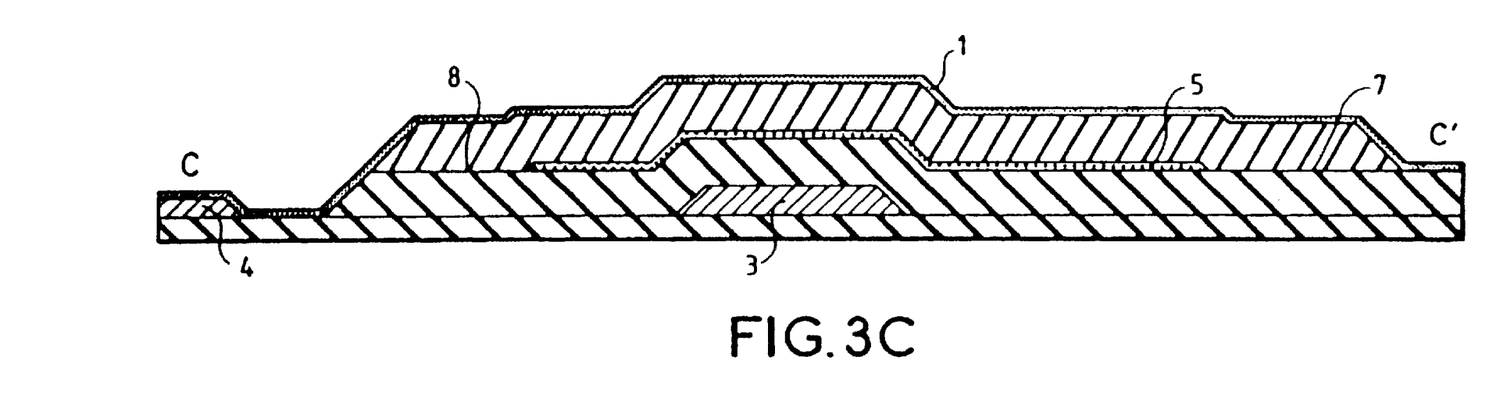

In addition, FIG. 1 shows the pixels in a delta arrangement, which means that each line of pixels is offset by a half-pixel, as shown by the references a and b in FIG. 1. In the figures, the reference 1 denotes the pixel electrodes. These electrodes are, in a known manner, made of a transparent conductive material such as indium-tin oxide ITO or tin oxide $SnO_2$. A transparent earth plane 5 lies beneath the pixel electrode, the former being of the same type as the material of the pixel electrode. As will be explained in more detail with reference to FIGS. 3, the earth plane is separated from the pixel electrodes by an insulator. Moreover, as shown in FIGS. 1 and 2, the reference 2 denotes the selection lines of the matrix screen, which are made of an opaque metallic material such as titanium, chromium, molybdenum, aluminium or tungsten. The width of each line 2 is defined so as to mask the optical defects present between the vertically adjacent pixel electrodes referenced 1 and 1' in FIG. 1, so as to mask the optical defects present between these vertically adjacent pixel electrodes when the screen is addressed in line-inversion mode. In the embodiment shown in FIG. 1, the selection lines 2 act as the opaque mask or "black matrix", allowing the contrast to be improved. Moreover, in the figures the reference 3 denotes the data lines or columns. These data lines or columns are made of a conductive material such as titanium, chromium, molybdenum, aluminium or tungsten. As shown in FIGS. 1 and 2, the data lines 3 are produced beneath the pixel electrode and their width may be reduced to the minimum, depending on the optical and electrical specifications imposed by the optical valve. Moreover, as shown in FIGS. 1 and 2, the drive electrodes form an electrically independent rectangular mosaic 1 and 1' whose spacing between identical pixels in all directions is defined by the resolution of the exposure system used for the photolithography. These electrodes 1 and 1' are positioned on top of the "black matrix", which is the selection line 2 in FIG. 1 or the optical mask 11 in FIG. 2. The "black matrix" pixel overlap is defined by the biasing of the earth plane, the spacing between the pixel electrodes and the properties of the materials used for operating the liquid crystal. The transistor drive device 9 is connected to the pixel electrode 1 via a control electrode 4 made of, a conductive metallic material identical to the material of the column 3. In order to make the connection, a window 8 is opened in the earth plane 5, as shown in FIGS. 1 and 2. Moreover, according to the present invention, the earth plane 5 is also cut away between the adjacent pixel electrodes 1 in a horizontal direction and has identical bias when the screen is addressed in line-inversion mode. This cut-away zone 7 is shown in FIGS. 1 and 2. Consequently, any transparent or non-transparent conducting level, which normally disorganizes the liquid-crystal molecules, has been eliminated in this zone 7. Thus, the zone 7 appears completely transparent and can therefore be counted in the optical aperture of the picture element so as to increase the OAR. of the drive transistor, in the case of a transistor of the bottom-gate type, and the selection line. A layer 11 forming the gate insulation has been deposited on this gate and this line, it being possible for this gate insulation, in a known manner, to be a layer of silica ($SiO_2$) or of silicon nitride (SiN). Deposited on the gate insulation, and then doped and etched, are a layer of hydrogenated amorphous silicon 12 and a layer of hydrogenated amorphous silicon doped so as to produce the active layer, the drain and the source of the switching transistor. Another metallic layer has been deposited on top of the amorphous silicon layer, which is etched so as to produce the data columns or lines 3 and the source and drain metal of the transistor, as shown in the various FIGS. 3. Next, according to the present invention, a layer of insulation 13 is deposited on top of the assembly, then the earth plane 5 made of a transparent conductive material such as indium-tin oxide ITO. As shown in FIGS. 3b and 3c, the earth plane 5 is etched so as to open a window 8 at the connection of the electrode of the source and drain metal with the pixel electrode, and the cut-away zone 7, at the space between pixel electrodes.

Figure 4:
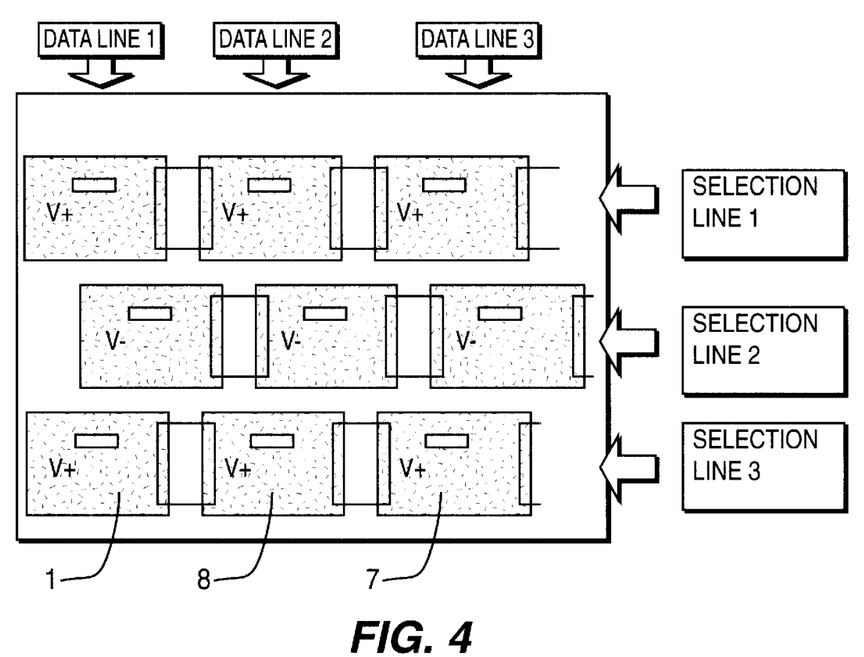
FIG. 4 is a simplified plan view of the active matrix display in a delta configuration which is a line-inversion mode device.
Figure 5:
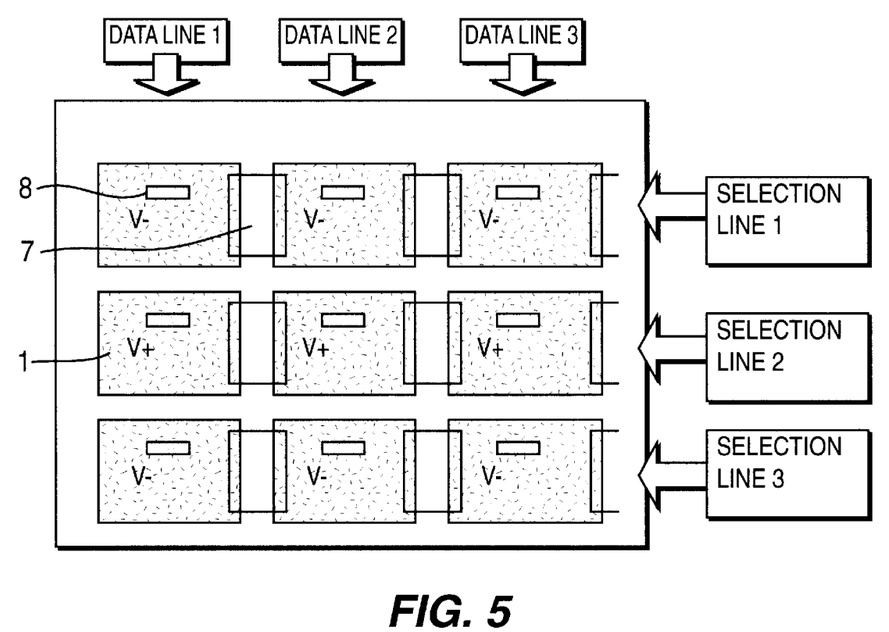
FIG. 5 is a simplified plan view of the active matrix display in a normal configuration which is a line-inversion mode device.
Figure 6:
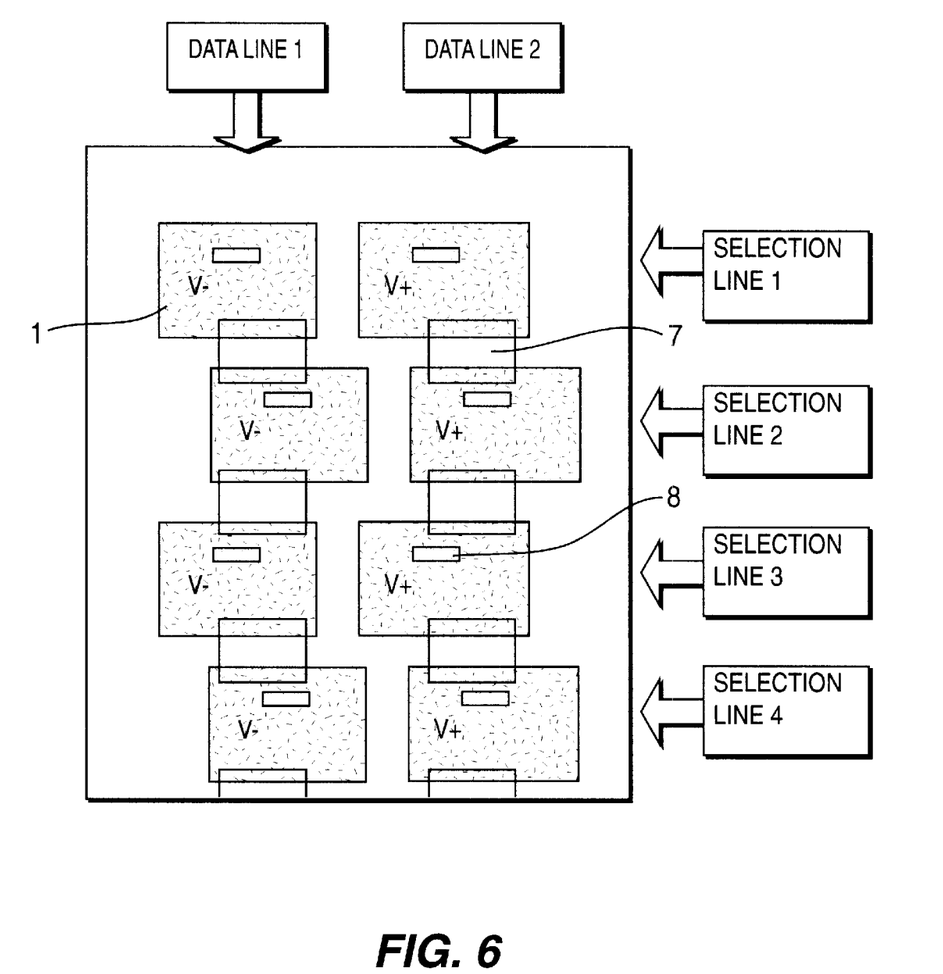
FIG. 6 is a simplified plan view of the active matrix display in a delta configuration which is a column-inversion mode device.

In FIG. 1, when the transistor drive device 9 consists of a light-sensitive active element, such as a transistor made of hydrogenated amorphous silicon, a patch 10 made of a conductive material having a high optical density is defined, in the case of a transistor of the bottom-gate type, above the element to be masked so as to shield it from the incident light. In the case of a reverse-staged transistor, this opaque metal shielding patch 10 is connected to the transparent earth plane 5 which is then addressed by a negative DC voltage in order to disturb as little as possible the off-state of the active element which must fulfill its switch function. In the embodiment in FIG. 1, the selection lines 2 are used as the "black matrix" and consequently have a large line width. This means that there are significant overlaps at the line/column level and the line/pixel electrode level, as may be seen in FIG. 1. These overlaps introduce not insignificant line/column coupling and line/pixel electrode coupling which may disturb the quality of the picture displayed on the display screen. In order to reduce these deleterious effects, it is therefore possible to use the shielding patch or "light shield" as the "black matrix". This is shown in FIG. 2. This is because, in this case, the selection lines 2 may have a narrower:width at the interpixel level. This width is adjusted in order to adapt the line/earth plane capacitance depending on the product. In this case, the "black matrix" following the selection line is made of an opaque metallic conductor 11, which replaces the shielding patch 10 in FIG. 1. The various layers used for producing the screen in FIG. 2 will now be described with reference to FIGS. 3a to 3c. As shown in FIGS. 3a and 3b, the glass substrate (not shown) firstly has deposited on it a metallic layer used for producing the gate According to the embodiment in FIG. 2, an opaque mask 6 made of conducting metal is deposited on top of the earth plane 5 in order to produce the "black matrix." As shown in FIGS. 3a, 3b and 3c, an additional layer 14 of an insulating material is deposited on top of the earth plane. This layer 14 is etched so as to open an aperture between the source and drain metal 4 and the transparent conducting layer, allowing the pixel electrode 1 to be produced. Next, the latter is deposited and etched on the assembly. Thus, according to the present invention, a transparent earth plane 5 is interposed between the array formed by the selection lines 2 and the data lines 3, the drive elements 9 and the control electrodes 1 in order to screen the pixel electrode/column 3 coupling and the pixel electrode/ line 2 coupling which impair the quality of the picture. The insulation between the earth plane 5 and the active matrix formed by the columns 3, the lines 2 and the drive elements 9, as well as the electrodes 1 for controlling the picture elements is provided by the insulating layers 13 and 14 that are interposed between the various conducting levels. The insulating layer between the earth plane 5 and the control electrodes 4 may be a planarization material of the SOG type, so as to eliminate the differences in steps which introduce optical effects that cannot easily be controlled. FIGS. 1 and 2 show a screen addressed in line-inversion mode, for which the pixel electrodes of the same line have identical bias while between directly neighbouring lines the bias is reversed. FIGS. 4 and 5 show simplified views of line-inversion mode devices according to the invention, with only the pixel electrodes 1, the cut-away zones 7, and apertures 8 shown, reflecting pixels in the delta and normal arrangements, respectively. The similar structure may be used for another screen device working in column-inversion mode as shown in FIG. 6, wherein the cut-away zones 7 are positioned between adjacent pixel electrodes 1 having the same polarity. In this case, the horizontally adjacent pixel electrodes have opposite bias, while the vertically adjacent pixel electrodes have identical bias. It is therefore necessary to mask the interpixel zone along the columns using a "black matrix" which, in this embodiment, is the column itself, while the line passes beneath the pixel electrode. In this case, in fact, the screen is rotated through 90° in the sense that the "black-matrix" is effectively formed of vertical columns, as opposed to the first embodiment, wherein the "black matrix" is formed of the horizontal selection lines.

According to another embodiment, the optical mask is deposited on the back electrode. Moreover, in the case of screens with colour filters, the zone between pixels with the same bias is masked using an optical mask called a "black matrix" placed on the back electrode in order to eliminate "cross colour".

The present invention is used mainly for the manufacture of flat active-matrix liquid-crystal screens, either monochrome screens or colour screens. The main applications are projection or back-projection devices, small monitors using valves of small dimensions requiring a high optical aperture, etc. The present invention offers a number of advantages, as mentioned below.

Firstly, no biased metallic level is placed between the pixel electrodes of identical biasing. Consequently, the liquid-crystal molecules in this interpixel region therefore experience only the electric field present between the two adjacent pixel electrodes. This zone therefore appears completely transparent and can therefore be counted in the optical open aperture ratio of the picture element. Preferably, in order to avoid excessively high light leakage in this interpixel region, the spacing between pixel electrodes must be less than-or equal to the thickness of the cell. Moreover, in the case of a valve with colour filters, in order to avoid colour mixing which may result in significant deviations in chrominance between the colour displayed and that desired, it is preferable to place an optical mask between pixels, unless the colour filter/control electrode alignment is controlled to within better than two micrometres in the case of a cell with a thickness of 4.5 micrometres and an interpixel spacing of 4 micrometres.

Secondly, when the drive element consists of a transistor of the top-gate type, the voltage of the earth plane which is placed on top of the transistor may be fixed at the voltage of the back electrode and the width of the "black matrix" necessary for masking the optical defects is defined for this so-called equilibrium voltage. On other hand, in the case of a transistor of the bottom-gate type, the voltage of the earth plane is maintained at a voltage close to the turn-off voltage of the drive transistors. The electric field between the pixel electrodes and the earth plane is therefore higher. Consequently, in the rubbing directions the width of the "black matrix" may be greater or smaller than that defined for the case of an earth-plane voltage equal to the back-electrode voltage.

Thirdly, in the case of a delta arrangement, as shown in FIGS. 1 and 2, the data lines or columns cross the pixel electrodes vertically without taking their arrangement into account, thereby making it much-easier to produce the screen.

Fourthly, the size of the drive device does not affect the "black matrix" width. This latter is dictated by the alignment precision of the exposure device used for the photolithography steps, the resolution of this device, the dispersion in overetching and the minimum overlap between the "black matrix" and the pixel electrode in order to mask the light leakage resulting from the electrooptic defects.

What is claimed is:

1. An active matrix display screen comprising:
    first and second transparent substrates placed substantially parallel to each other with facing surfaces,
    a liquid-crystal material lying between the said surfaces,
    at least one back electrode covering the surface of the first substrate,
    the surface of the second substrate supporting pixel electrodes arranged in a matrix structure, data lines lying in a first direction, selection lines lying in a second direction which intersects the first direction, solid-state switching devices for electrically connecting the data lines to the pixel electrodes, the pixel electrodes lying in a first plane while the data lines, the selection lines and the switching devices lie in at a second plane at some distance from the first plane, and
    a transparent earth plane lying between the two planes, wherein:
        the earth plane which is transparent and conductive has a window for connecting each pixel electrode to a corresponding switching device, and the earth plane has in addition a cut-away zone to form a non-conducting transparent region, the cut-away zone lying between two pixel electrodes, thereby causing the active matrix display screen to have an increased open aperture ratio.

2. The active matrix display screen according to claim 1, wherein, when said active matrix display screen is a line-inversion mode device, the cut-away zones, which are produced between two adjacent pixel electrodes, are grouped into sets that run in the direction of the selection lines.

3. The active matrix display screen according to claim 2, wherein that an opaque mask called a "black matrix" is produced by the selection lines lying between the pixel electrodes.

4. The active matrix display screen according to claim 1, wherein, when said active matrix display screen is a column-inversion mode device, the cut-away zones, which are produced between two adjacent pixel electrodes, are grouped into sets that run in the direction of the data lines.

5. The active matrix display screen according to claim 4, wherein that an opaque mask called a "black matrix" is produced by the data lines lying between the pixel electrodes.

6. The active matrix display screen according to claim 1, wherein the spacing between pixel electrodes is less than or equal to the thickness of the active matrix display screen formed from the two substrates and the liquid-crystal material.

7. The active matrix display screen according to claim 1, wherein an opaque metal mask forming a "black matrix" and a light-shielding screen is produced on top of the selection lines and of the solid-state switching devices.

8. The active matrix display screen according to claim 1, wherein an opaque metal mask forming a "black matrix" and a light-shielding screen is produced on top of the data lines and of the solid-state switching devices.

9. The active matrix display screen according to claim 1, wherein the data lines are produced beneath the pixel electrodes.

10. The active matrix display screen according to claim 1, wherein the selection lines are produced beneath the pixel electrodes.

11. The active matrix display screen according to claim 1, wherein the earth plane is connected to a voltage equal to the back-electrode voltage, thereby making the switching device a transistor drive device of the top-gate type.

12. The active matrix display screen according to claim 1, wherein the earth plane is connected to a voltage close to the turn-off voltage of the switching device, thereby making the switching device a transistor drive device of the bottom-gate type.

13. The active matrix display screen according to claim 1, wherein, in the case of line inversion and when the pixel electrodes have a delta arrangement, the data lines arc straight.

14. The active matrix display screen according to claim 1, wherein, when the active matrix display screen is column-inversion mode device, all the pixels connected to a data line have the same bias, while two adjacent pixels connected to the same selection line have reversed bias and in that, in this case, the "black matrix" being placed beneath the data lines, there is no metal in the space between pixels with the same bias.

15. The active matrix display screen according to claim 1, wherein the active matrix display screen has an optical mask, the optical mask is located on the back electrode.

* * * * *